(12) United States Patent
Beier et al.

(10) Patent No.: US 11,673,350 B2
(45) Date of Patent: Jun. 13, 2023

(54) PRODUCTION METHOD AND PRODUCTION SYSTEM FOR PRODUCING A CONTINUOUS-FIBER-REINFORCED COMPONENT

(71) Applicant: Airbus (S.A.S.), Blagnac (FR)

(72) Inventors: Uwe Beier, Höhenkirchen-Siegertsbrunn (DE); Christian Metzner, Gmund (DE)

(73) Assignee: Airbus (S.A.S.), Blagnac (FR)

( * ) Notice: Subject to any disclaimer, the term of this patent is extended or adjusted under 35 U.S.C. 154(b) by 2 days.

(21) Appl. No.: 17/220,274

(22) Filed: Apr. 1, 2021

(65) Prior Publication Data
US 2021/0308958 A1 Oct. 7, 2021

(30) Foreign Application Priority Data
Apr. 7, 2020 (DE) ...................... 10 2020 109 741.7

(51) Int. Cl.
*B29C 70/20* (2006.01)
*B29C 64/40* (2017.01)
*B29C 71/00* (2006.01)
*C08J 5/06* (2006.01)
*B33Y 10/00* (2015.01)
(Continued)

(52) U.S. Cl.
CPC ............ *B29C 70/205* (2013.01); *B29C 64/40* (2017.08); *B29C 71/00* (2013.01); *B33Y 10/00* (2014.12); *B33Y 30/00* (2014.12); *B33Y 70/10* (2020.01); *B33Y 80/00* (2014.12); *C08J 5/06* (2013.01)

(58) Field of Classification Search
CPC ..... B29C 70/205; B29C 70/745; B29B 15/10; B29B 15/105; B29B 15/14; B29B 15/122
See application file for complete search history.

(56) References Cited

U.S. PATENT DOCUMENTS

2014/0191437 A1\* 7/2014 Johnson ................ B29C 70/021
425/71

FOREIGN PATENT DOCUMENTS

DE   10 2005 005 729 A1   8/2006
DE   10 2005 024408 A1   11/2006
(Continued)

OTHER PUBLICATIONS

European Search Report for Application No. 21165529.4 dated Jul. 30, 2021.
(Continued)

*Primary Examiner* — Michael P Wieczorek
(74) *Attorney, Agent, or Firm* — KDW Firm PLLC

(57) ABSTRACT

To improve the range of application of manufacturing methods for fiber-reinforced polymer or metal hybrid composite components, and preferably to enable the introduction of fiber bundles into a larger number of geometries, such as branches, merging points and intersections, a production method for producing a component including a composite material with a fiber reinforcement which is formed from fiber bundles and resin is disclosed. A component body with tube-like cavities is initially provided. Curable resin is introduced into the cavities. A pulling apparatus for the fiber bundles is also inserted into at least one of the cavities. The pulling apparatus includes at least one pulling member suitable for pulling the fiber bundles and transmitting compressive force. As a result of pulling of the pulling member, the fiber bundles are pulled into the cavities.

20 Claims, 5 Drawing Sheets

(51) Int. Cl.
*B33Y 30/00* (2015.01)
*B33Y 80/00* (2015.01)
*B33Y 70/10* (2020.01)

(56) References Cited

FOREIGN PATENT DOCUMENTS

| EP | 3 231 592 A1 | 10/2017 |
| EP | 3 769 945 A1 | 1/2021 |
| WO | WO 2017/202669 A1 | 11/2017 |
| WO | WO 2021/013935 A1 | 1/2021 |

OTHER PUBLICATIONS

German Search Report for Application No. 10 2020 109 741.7 dated Mar. 26, 2021.

* cited by examiner

PRODUCTION METHOD AND PRODUCTION SYSTEM FOR PRODUCING A CONTINUOUS-FIBER-REINFORCED COMPONENT

CROSS-REFERENCE TO RELATED APPLICATION

This application claims priority to German Patent Application No. 10 2020 109 7417 filed Apr. 7, 2020, the entire disclosure of which is incorporated by reference herein.

TECHNICAL FIELD

The disclosure herein relates to a production method and to a production system for producing a continuous-fiber-reinforced component.

Fiber-reinforced composite parts are usually produced with more or less adapted fiber orientation. In this case, composite components may contain not only plastics materials or polymer materials. Composite components composed of metal or light metal and fibers are also conceivable. The possibilities for adaptation are generally exhausted within the limits of the manufacturing process. However, this can lead to a more elaborate manufacturing operation, particularly if a high degree of fiber orientation is to be achieved; this is generally associated with more complex and slower manufacturing methods.

BACKGROUND

Examples of improved manufacturing methods which increase the degree of fiber orientation are 3D printing, overmolding of fiber reinforcements, winding fibers around metal eyes or lugs, compression molding of carbon-fiber-reinforced semifinished polymer products.

The European patent application 19 380 014.1, yet to be published at the priority date of the present application, discloses a method in which continuous fibers are introduced into oriented tubular openings of the component by injecting resin and continuous fibers together. The contents of patent application 19 380 014.1 are incorporated by way of reference into the present application for the purposes of disclosure.

SUMMARY

The disclosure herein is based on the object of improving the range of application of such manufacturing methods, in particular of enabling the introduction of fibers into a larger number of geometries.

The object is achieved by the subject matter disclosed herein.

The disclosure herein provides a production method for producing a component composed of a composite material with a fiber reinforcement which is formed from fiber bundles and resin, the method comprising the steps of:
a) providing a component body with a plurality of tube-like cavities;
b) introducing resin and a pulling apparatus for the fiber bundles into at least one of the cavities, the pulling apparatus having at least one pulling member which is configured to pull the fiber bundles and to transmit compressive force;
c) pulling at least one fiber bundle into the cavity by way of the at least one pulling member.

It is preferred that step a) comprises:
forming the component body with a first region composed of a first polymer material and with a second region composed of a second polymer material.
It is preferred that step a) comprises:
selecting a first polymer material from a group of materials which can be dissolved in a solvent or in a mechanical manner, preferably by breaking down or breaking away, and selecting a second polymer material from a group of materials which cannot be dissolved in the solvent.
It is preferred that step a) comprises:
selecting the metal material from a group which comprises metals, for example steel, and light metals, for example aluminum or titanium, or respective alloys.
It is preferred that step a) comprises:
producing the component body by way of additive layer manufacturing.
It is preferred that step a) comprises:
forming the component body with second regions which define openings of the cavities.
It is preferred that step a) comprises:
forming the component body with second regions which define curvature regions of the cavities.
It is preferred that step a) comprises:
forming the component body with second regions which define branching regions for the fiber reinforcement.
It is preferred that step a) comprises:
forming the component body with at least one first region which defines a middle region of the cavities.
It is preferred that step a) comprises:
forming the component body with at least one first region which is defines a straight portion of the cavity.
It is preferred that step a) comprises:
forming the component body with a relatively large amount of first polymer material and a relatively small amount of second polymer material.
Preferably, at least 60% by weight, more preferably 70% by weight to 95% by weight, of the component body is formed from the first polymer material.
It is preferred that step a) comprises:
forming the component body with a plurality of second regions which are spaced apart from one another and are coupled by at least one first region.
It is preferred that step a) comprises:
forming the component body such that at least one cavity extends through at least one first region and a second region.
It is preferred that step a) comprises:
adding and/or connecting a metal element to the component body such that the metal element has openings which coincide with open ends of the cavities.
It is preferred that step b) and/or c) comprises:
simultaneously introducing the resin in an uncured state and pulling in the fiber bundle.
It is preferred that step b) and/or c) comprises:
successively introducing the resin and pulling in the continuous fibers, preferably first the continuous fibers and then the resin in a curable state.
It is preferred that step b) comprises:
jointly introducing a first pulling member and a second pulling member through the same end opening of the cavity, wherein, at a branch of the cavity, the first pulling member is introduced into a first cavity which branches off from the cavity, whereas the second pulling member is introduced into a second cavity which branches off from the cavity.

It is preferred that step b) comprises:
introducing a first pulling member through an end opening into a first cavity and a second pulling member through an end opening into a second cavity, the first pulling member and the second pulling member being brought together into a merged cavity at a merging point of the first cavity with the second cavity.

It is preferred that step b) comprises:
introducing the pulling member through an end opening into a first cavity and guiding the pulling member out of an opening of the first cavity, and subsequently introducing the pulling member through an opening into a second cavity.

It is preferred that step c) comprises:
pulling in the fiber bundles with application of an ultrasonic field preferably in a water bath.

It is preferred that step c) comprises:
pulling in the fiber bundle such that the fiber bundle extends partially outside the cavity between two openings.

It is preferred that step c) comprises:
removing the fiber bundle which extends partially outside the cavity.

It is preferred that step b) and/or c) comprise:
introducing the pulling member into a first cavity, which forms an intersection with a second cavity, and pulling a first fiber bundle into the first cavity; and then
introducing the pulling member into the second cavity through the intersection, the pulling member preferably bypassing or piercing the first fiber bundle, and pulling in a second fiber bundle, such that the first fiber bundle and the second fiber bundle intersect or crisscross.

It is preferred that step c) comprises:
pulling a continuous-fiber bundle into at least one cavity by a mechanical tensile force which is applied to the continuous-fiber bundle.

It is preferred that step c) comprises:
pulling in reinforcing fibers, preferably carbon fibers and/or carbon-fiber bundles.

It is preferred that step c) comprises:
curing the resin after introduction of the resin and the continuous fibers into the cavities.

It is preferred that step c) comprises:
pulling in functional fibers, preferably glass fibers and/or ceramic fibers.

It is preferred that step c) comprises:
pulling in glass fibers for formation of at least one temperature measuring strip and/or strain gauge.

It is preferred that step c) comprises:
pulling in ceramic fibers, preferably for formation of an actuator or sensor, more preferably for formation of one or more piezoelectric actuators or sensors.

It is preferred that the component body has a first region composed of a first polymer material and a second region composed of a second polymer material, the first polymer material being selected such that it can be dissolved in a solvent, the second polymer material being selected such that it cannot be dissolved in the solvent.

The method preferably comprises the step:
d) at least partially removing the first polymer material by dissolving the first polymer material in the solvent.

It is preferred that step d) comprises:
dissolving the first polymer material in the solvent.

It is preferred that step d) comprises:
removing at least one first region.

It is preferred that step d) comprises:
removing the entire first polymer material from the component body.

The method preferably comprises the step:
e) curing the resin.

A composite material component is obtainable by one of the production methods disclosed herein.

The composite material component is preferably configured in the form of a reinforced framework structure.

A production system for carrying out a production method as disclosed herein comprises:
an additive manufacturing apparatus which is configured to create the component;
a resin-introducing apparatus which is configured to introduce curable resin into the cavity; and
a pulling apparatus which is configured to pull fiber bundles into the cavity.

An unprocessed component with cavities along the load paths can initially be provided, for example by 3D printing. The material selection between thermoplastic and thermosetting polymers can be made such that an optimized interdiffusion bond to the fibers is possible. Substructures can also be bonded by interdiffusion. It is also conceivable for an unprocessed component with cavities along the load paths to be 3D-printed based on metal, for example titanium, aluminum, steel and the like.

The fiber material is selected and integrated depending on the desired function. By way of example, reinforcing fibers composed of carbon, glass, ceramic and the like are conceivable. The cross-sectional shape of the cavities can also be adapted to the expected load. The cavities can thus be of circular or non-round form. For example, a star-shaped cross section serves for improved protection against buckling. By the method described herein, these different cross sections can be handled in a simpler manner.

The pulling member can be configured in the form of a rod provided with a sliding coating. It is for example possible for impregnated fiber bundles to be attached to the pulling member. A gripper or the like is also conceivable. The pulling-in operation permits a variation of the diameters of the cavities, wherein fiber bundles which are adapted to the cavities are spliced and pulled in. Fiber bundles can thus also be supplied to branches and merging points of cavities.

It is furthermore possible for the movement of the pulling apparatus to be facilitated in that the pulling-in operation is aided in a water bath and/or with ultrasound. Entangled nodes can also be formed at intersection points by piercing the fiber bundles and pulling through a further fiber bundle.

The entire method can be accelerated if the pulling apparatus is guided through all of the cavities. It is thus possible for continuous fibers to be pulled through all of the cavities in a single step.

Finally, the resin can be cured. Superfluous regions can also be removed, for example by a solvent. The component can be created by additive manufacturing, which, in particular, uses different materials simultaneously. Even though the focus is on fiber composite materials, the method described herein can also be utilized for ceramic or metal composite components.

It should be noted that the enumerations serve merely for better reference and do not imply a sequence of the method steps.

BRIEF DESCRIPTION OF THE DRAWINGS

Example embodiments are explained in more detail with reference to the attached schematic drawings, in which.

DETAILED DESCRIPTION

Figure 1:
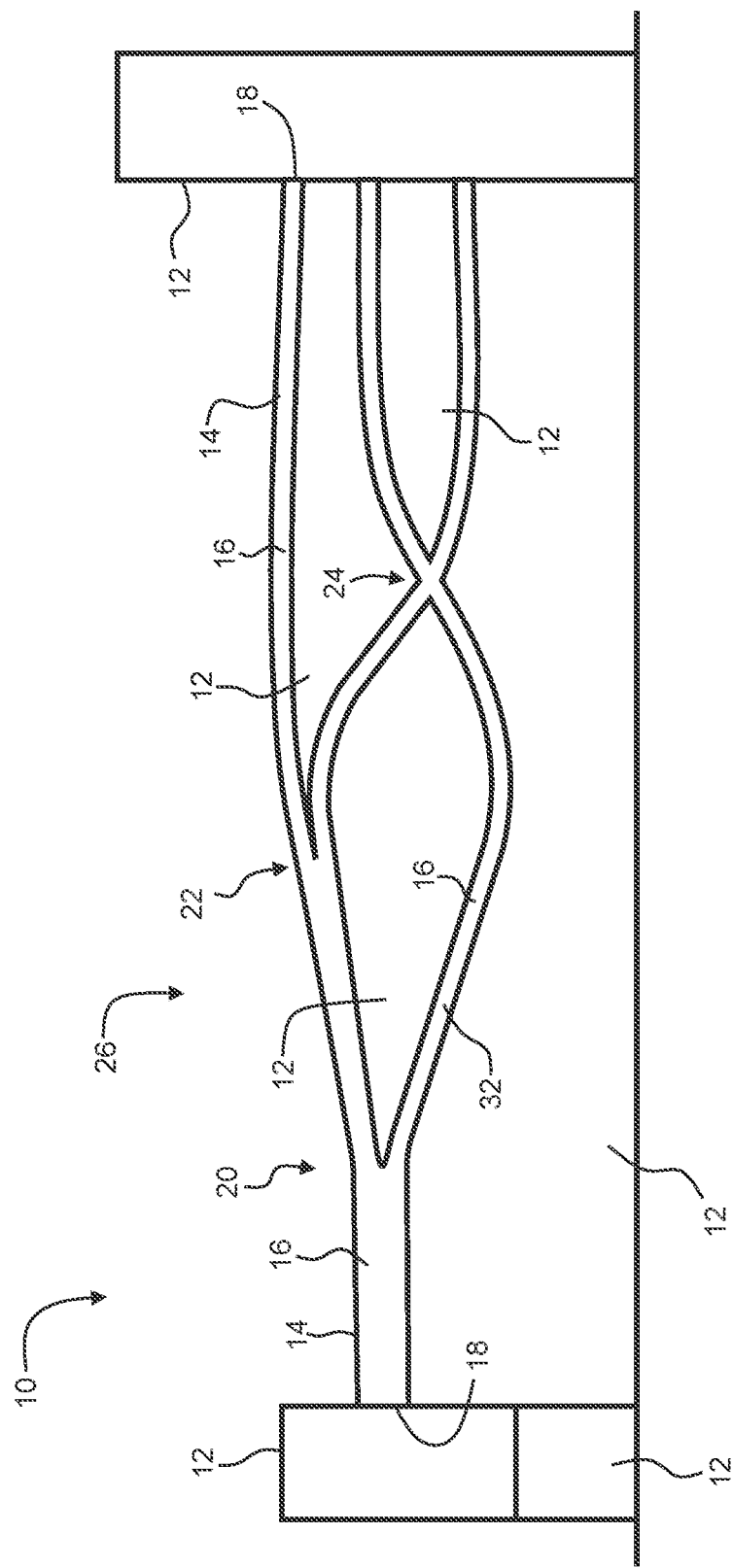
FIG. 1 shows an example embodiment of a component body.

Reference is first made to FIG. 1, which shows an example embodiment of a component body 10. The component body 10 contains a first region 12. The first region 12 is produced from a polymer material which can be dissolved in a solvent. The first region 12 can function as a support or auxiliary structure known per se.

The component body 10 contains a second region 14. The second region 14 is produced from a polymer material which cannot be dissolved in the solvent. The second region 14 preferably forms the basic structure of the component body 10 which is intended to be reinforced by fibers.

The component body 10 contains a plurality of tube-like cavities 16. The tube-like cavities 16 each have an end opening 18, by which the cavities 16 are in fluidic connection with the surroundings. The properties of the cavities 16, for instance their profile in the component body 10, their extent or their cross-sectional shape, are ascertained for example on the basis of load simulations.

The cavities 16 can form branches 20, merging points 22 or intersections 24.

In order to produce a fiber-reinforced component 26, the component body 10 is initially provided. This can take place for example by way of additive manufacturing. The first region 12 and the second region 14 can be created for example by way of a fused layer process, for example filament layer manufacturing (FLM).

In a further step, fiber bundles 27 are introduced into the cavities 16. The fiber bundles 27 can be dry or pre-impregnated. For introduction of the fiber bundles 27, a pulling apparatus 28 having at least one pulling member 30 is initially provided. The pulling member 30 is introduced into one of the cavities 16.

The pulling member 30 is created such that it withstands compressive loading. The pulling member 30 is configured for example in the form of a flexible rod or wire. More complex pulling member(s) 30 with grippers or with a controllability similar to an endoscope are also possible.

The fiber bundle 27 is fastened to the pulling member 30 and pulled into the cavity 16. Curable resin 32 is also introduced into the cavity 16. The resin 32 can be introduced by a resin-injecting apparatus (not illustrated in any more detail) or by the pulling apparatus 28. Furthermore, the fiber bundles 27 can also be soaked in the resin 32 such that an additional injection operation can be dispensed with.

The pulling-in of the fiber bundles 27 is preferably effected with application of an ultrasonic field to the component body 10. This can be effected for example in a liquid, which preferably does not dissolve the first polymer material.

The resin 32 is cured in a manner known per se. The first region 12 is also removed by solvent.

The fiber-reinforced component 26 remains.

Figure 2:
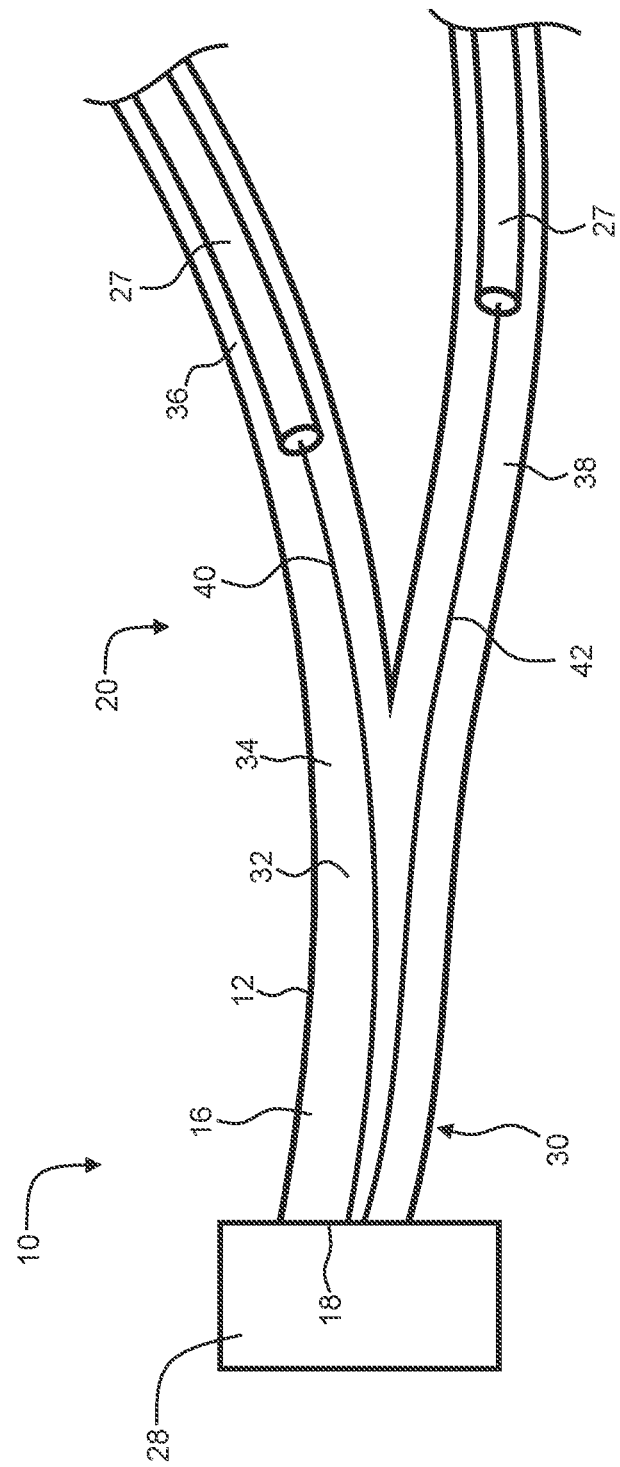
FIG. 2 shows a detail view of a branch.

FIG. 2 shows a detail view of a branch 20. The branch 20 is formed by the cavities 16, usually by a common cavity 34 and also a first cavity 36 and a second cavity 38 which branch off from the common cavity 34. It is also conceivable for there to be more than two branches.

The pulling member 30 contains a first pulling member 40 and a second pulling member 42. The two pulling members 40, 42 are initially introduced into the common cavity 34 and subsequently divided into the first cavity 36 and the second cavity 38, respectively.

The fiber bundles 27 are designed such that the fiber bundles 27 together fill the common cavity 34 in a desired quantity. The fiber bundles 27 are pulled in by the first and second pulling members 40, 42. Resin 32 is also introduced. The curing is then effected in a customary manner.

Figure 3:
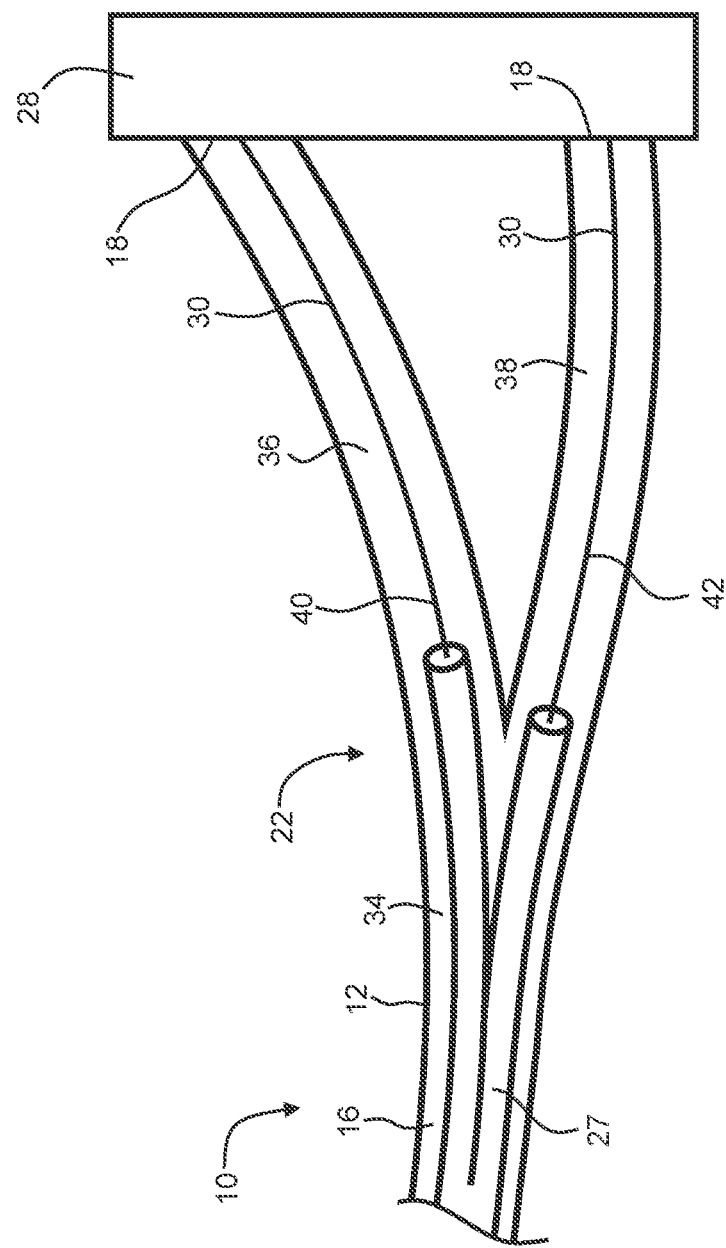
FIG. 3 shows a detail view of a merging point.

FIG. 3 shows a detail view of a merging point 22. The merging point 22 is formed by the cavities 16, usually by a common cavity 34 and also a first cavity 36 and a second cavity 38 which merge at the common cavity 34. It is also conceivable for there to be more than two merging points.

The pulling member 30 contains a first pulling member 40 and a second pulling member 42. The two pulling members 40, 42 are introduced in each case into the first cavity 36 and the second cavity 38 and subsequently brought together in the common cavity 34.

The fiber bundles 27 are designed such that the fiber bundles 27 together fill the common cavity 34 in a desired quantity. It is also conceivable for merely one fiber bundle 27 to be used which has been divided into two ends. The fiber bundles 27 are pulled in by the first and second pulling members 40, 42. Resin 32 is also introduced. The curing is then effected in a customary manner.

Figure 4:
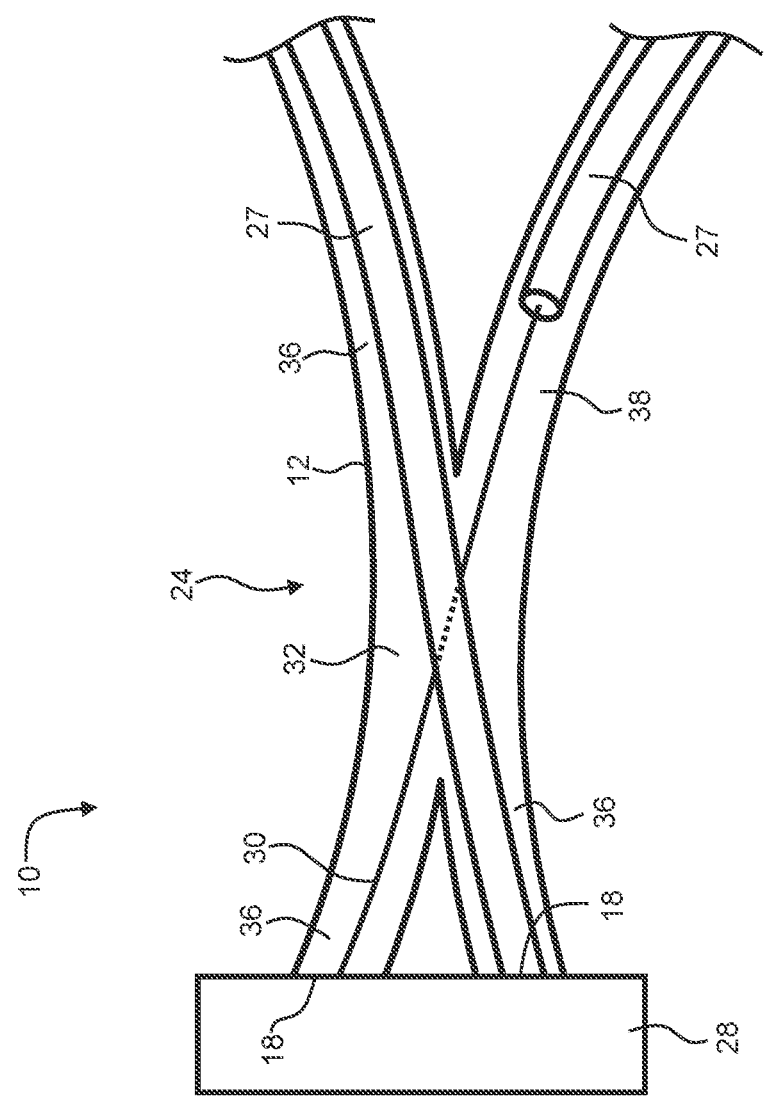
FIG. 4 shows a detail view of an intersection.

FIG. 4 shows a detail view of an intersection 24. The intersection 24 is formed by the cavities 16, usually by a first cavity 36 and a second cavity 38. A multiple intersection is also possible.

The pulling member 30 can be introduced successively into the first cavity 36 and the second cavity 38 and can pull in a respective fiber bundle 27. During the introduction of the pulling member 30 into the second cavity 38, the fiber bundle 27 which is already located in the first cavity 36 can be pierced by the pulling member. The fiber bundles 27 then crisscross at this point. Resin 32 is also introduced. The curing is then effected in a customary manner.

Figure 5:
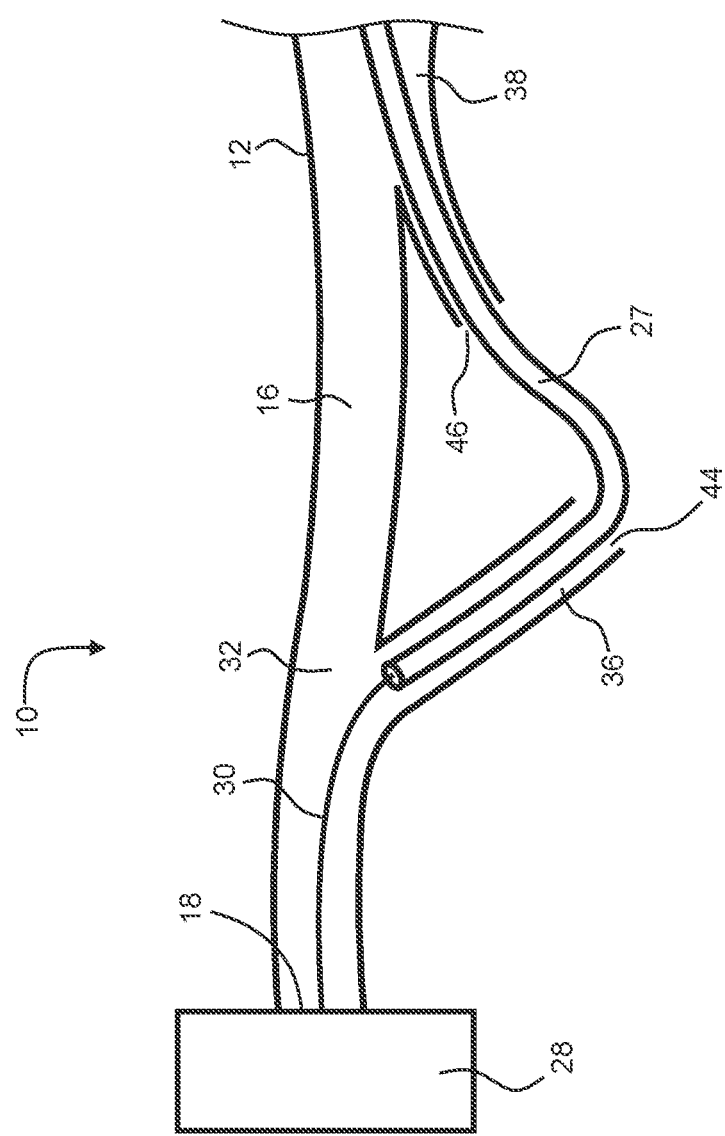
FIG. 5 shows a view of a component body.

FIG. 5 shows a view of a component body 10 with a branch 20 and a merging point 22. The pulling member 30 can be guided through a first cavity 32 until it exits at an end opening 44. The pulling member 30 is subsequently introduced via a further end opening 46 back into a second cavity 34.

The pulling member 30 makes it possible to pull the fiber bundle 27 through the first and second cavities 32, 34 in one step. This procedure is preferably selected for the reinforcement of eyes and the like. The fiber bundle 27 which is not located in the cavity 16 can be cut away before or after the curing operation. Resin 32 is also introduced. The curing is then effected in a customary manner.

Overall, the method described herein can be used to generate components 26 which are more complex than hitherto. In particular, it is possible to manufacture a fiber reinforcement in fewer work steps than hitherto. Configurations which hitherto cannot be produced, or can be produced only with difficulty, are also possible.

In order to improve the range of application of manufacturing methods for fiber-reinforced components 26, and preferably to enable the introduction of fiber bundles into a larger number of geometries, such as branches, merging points and intersections, a production method for producing a component 26 composed of a composite material with a fiber reinforcement which is formed from fiber bundles 27 and resin 32 is proposed. A component body 10 with a plurality of tube-like cavities 16 is initially provided. Curable resin 32 is introduced into the cavities. A pulling apparatus 28 for the fiber bundles 27 is also inserted into at least one of the cavities 16. The pulling apparatus 28 comprises at least one pulling member 30 which is suitable for pulling the fiber bundles 27 and transmitting compressive force. As a result of pulling of the pulling member 30, the fiber bundles 27 are pulled into the cavities 16.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE DESIGNATIONS

10 Component body
12 First region
14 Second region
16 Cavity
18 End opening
20 Branch
22 Merging point
24 Intersection
26 Fiber-reinforced component
27 Fiber bundle
28 Pulling apparatus
30 Pulling member
32 Curable resin
34 Common cavity
36 First cavity
38 Second cavity
40 First pulling member
42 Second pulling member
44 End opening
46 Further end opening

The invention claimed is:

1. A production method for producing a component comprising a composite material with a fiber reinforcement which is formed from fiber bundles and resin, the method comprising steps of:
   a) providing a component body with a plurality of cavities;
   b) introducing resin and a pulling apparatus for the fiber bundles into at least one of the cavities, the pulling apparatus having at least one pulling member for pulling the fiber bundles and for transmitting compressive force; and
   c) pulling at least one fiber bundle into the at least one of the cavities by way of the at least one pulling member;
   wherein step b) comprises introducing the pulling member into all of the cavities.

2. The method of claim 1, wherein step a) comprises:
   a1) forming the component body with a first region comprising a first polymer material and with a second region comprising a second polymer material or a metal material; and/or
   a2) selecting, from a group of materials which can be dissolved in a solvent, a first polymer material and selecting, from a group of materials which cannot be dissolved in the solvent, a second polymer material; and/or
   a3) selecting the metal material from a group consisting of steel, aluminum, and/or titanium, or respective alloys there; and/or
   a4) producing the component body by additive layer manufacturing; and/or
   a5) forming the component body with second regions which define openings of the plurality of cavities; and/or
   a6) forming the component body with second regions which define curvature regions of the plurality of cavities, and/or
   a7) forming the component body with second regions which define branching regions for the fiber reinforcement; and/or
   a8) forming the component body with at least one first region which defines a middle region of the cavities; and/or
   a9) forming the component body with at least one first region which defines a straight portion of the cavity; and/or
   a10) forming the component body with an amount of the first polymer material that is greater than an amount of the second polymer material; and/or
   a11) forming the component body with a plurality of second regions which are spaced apart from one another and are coupled by at least one first region; and/or
   a12) forming the component body such that at least one cavity extends through at least one first region and a second region; and/or
   a13) adding and/or connecting a metal element to the component body such that the metal element has openings which coincide with open ends of the cavities.

3. The method of claim 1, wherein step b) and/or c) comprises:
   simultaneously introducing the resin in an uncured curable state and pulling in the fiber bundle; or
   successively introducing the resin and pulling in the fiber bundle, first the fiber bundle and then the resin in the uncured curable state.

4. The method of claim 1, wherein step b) comprises:
   b1) jointly introducing a first pulling member and a second pulling member through the same end opening of the cavity, wherein, at a branch of the cavity, the first pulling member is introduced into a first cavity which branches off from the cavity, whereas the second pulling member is introduced into a second cavity which branches off from the cavity.

5. The method of claim 1, wherein step b) comprises:
   b2) introducing a first pulling member through an end opening into a first cavity and a second pulling member through a further end opening into a second cavity, the first pulling member and the second pulling member being brought together into a common cavity at a merging point of the first cavity with the second cavity.

6. The method of claim 1, wherein step b) comprises:
   b3) introducing the pulling member through an end opening into a first cavity and guiding the pulling member out of an opening of the first cavity, and subsequently introducing the pulling member through an opening into a second cavity.

7. The method of claim 1, wherein step c) comprises:
pulling in the fiber bundle such that the fiber bundle extends partially outside the cavity between two openings; and/or
removing the fiber bundle which extends partially outside the cavity.

8. The method of claim 1, wherein step c) comprises:
c1) pulling in the fiber bundles with application of an ultrasonic field in a liquid bath; and/or
c2) pulling a continuous-fiber bundle into at least one cavity by a mechanical tensile force which is applied to the continuous-fiber bundle; and/or
c3) pulling in reinforcing fibers, carbon fibers and/or carbon-fiber bundles; and/or
c4) curing the resin after introduction of the resin and the continuous fibers into the cavities; and/or
c5) pulling in functional fibers, glass fibers and/or ceramic fibers; and/or
c6) pulling in glass fibers for formation of at least one temperature measuring strip and/or strain gauge; and/or
c7) pulling in ceramic fibers, for formation of an actuator or sensor, or for formation of one or more piezoelectric actuators or sensors.

9. The method of claim 1, wherein step b) and/or c) comprise:
introducing the pulling member into a first cavity, which forms an intersection with a second cavity, and pulling a first fiber bundle into the first cavity; and then
introducing the pulling member into the second cavity through the intersection, the pulling member bypassing or piercing the first fiber bundle, and pulling in a second fiber bundle, such that the first fiber bundle and the second fiber bundle intersect or crisscross.

10. The method of claim 1, comprising a step of:
d) at least partially removing the first polymer material.

11. The method of claim 10, wherein step d) comprises:
d1) dissolving the first polymer material in the solvent; and/or
d2) removing at least one first region; and/or
d3) mechanically removing the entire first polymer material from the component body.

12. The method of claim 1, comprising a step of:
e) curing the resin.

13. A production method for producing a component comprising a composite material with a fiber reinforcement which is formed from fiber bundles and resin, the method comprising steps of:
a) providing a component body with a plurality of cavities;
b) introducing resin and a pulling apparatus for the fiber bundles into at least one of the cavities, the pulling apparatus having at least one pulling member for pulling the fiber bundles and for transmitting compressive force; and
c) pulling at least one fiber bundle into the at least one of the cavities by way of the at least one pulling member;
wherein step b) comprises:
b1) jointly introducing a first pulling member and a second pulling member through the same end opening of the cavity, wherein, at a branch of the cavity, the first pulling member is introduced into a first cavity which branches off from the cavity, whereas the second pulling member is introduced into a second cavity which branches off from the cavity; and/or
b2) introducing a first pulling member through an end opening into a first cavity and a second pulling member through a further end opening into a second cavity, the first pulling member and the second pulling member being brought together into a common cavity at a merging point of the first cavity with the second cavity; and/or
b3) introducing the pulling member through an end opening into a first cavity and guiding the pulling member out of an opening of the first cavity, and subsequently introducing the pulling member through an opening into a second cavity.

14. The method of claim 13, wherein step a) comprises:
a1) forming the component body with a first region comprising a first polymer material and with a second region comprising a second polymer material or a metal material; and/or
a2) selecting, from a group of materials which can be dissolved in a solvent, a first polymer material and selecting, from a group of materials which cannot be dissolved in the solvent, a second polymer material; and/or
a3) selecting the metal material from a group which comprises metals, steel, light metals, aluminum or titanium, or respective alloys; and/or
a4) producing the component body by additive layer manufacturing; and/or
a5) forming the component body with second regions which define openings of the cavities; and/or
a6) forming the component body with second regions which define curvature regions of the cavities, and/or
a7) forming the component body with second regions which define branching regions for the fiber reinforcement; and/or
a8) forming the component body with at least one first region which defines a middle region of the cavities; and/or
a9) forming the component body with at least one first region which defines a straight portion of the cavity; and/or
a10) forming the component body with a relatively large amount of first polymer material and a relatively small amount of second polymer material; and/or
a11) forming the component body with a plurality of second regions which are spaced apart from one another and are coupled by at least one first region; and/or
a12) forming the component body such that at least one cavity extends through at least one first region and a second region; and/or
a13) adding and/or connecting a metal element to the component body such that the metal element has openings which coincide with open ends of the cavities.

15. The method of claim 13, wherein step b) and/or c) comprises:
simultaneously introducing the resin in an uncured curable state and pulling in the fiber bundle; or
successively introducing the resin and pulling in the fiber bundle, first the fiber bundle and then the resin in the uncured curable state.

16. The method of claim 13, wherein step c) comprises:
pulling in the fiber bundle such that the fiber bundle extends partially outside the cavity between two openings; and/or removing the fiber bundle which extends partially outside the cavity; and/or c1) pulling in the fiber bundles with application of an ultrasonic field in a liquid bath; and/or c2) pulling a continuous-fiber bundle into at least one cavity by a mechanical tensile force which is applied to the continuous-fiber bundle; and/or c3) pulling in reinforcing fibers, carbon fibers and/or carbon-fiber bundles; and/or c4) curing the resin after introduction of the resin and the continuous fibers into the cavities; and/or c5) pulling in functional fibers, glass fibers and/or ceramic fibers; and/or c6) pulling in glass fibers for formation of at least one temperature measuring strip and/or strain gauge; and/or c7) pulling in ceramic fibers, for formation of an actuator or sensor, or for formation of one or more piezoelectric actuators or sensors.

17. The method of claim 13, comprising a step of:

d) at least partially removing the first polymer material.

18. The method of claim 17, wherein step d) comprises:

d1) dissolving the first polymer material in the solvent; and/or d2) removing at least one first region; and/or d3) mechanically removing the entire first polymer material from the component body.

19. The method of claim 13, comprising a step of:

e) curing the resin.

20. A production method for producing a component comprising a composite material with a fiber reinforcement which is formed from fiber bundles and resin, the method comprising steps of:

a) providing a component body with a plurality of cavities;

b) introducing resin and a pulling apparatus for the fiber bundles into at least one of the cavities, the pulling apparatus having at least one pulling member for pulling the fiber bundles and for transmitting compressive force; and c) pulling at least one fiber bundle into the at least one of the cavities by way of the at least one pulling member;

wherein step b) and/or step c) comprise:

introducing the pulling member into a first cavity, which forms an intersection with a second cavity, and pulling a first fiber bundle into the first cavity; and then introducing the pulling member into the second cavity through the intersection, the pulling member bypassing or piercing the first fiber bundle, and pulling in a second fiber bundle, such that the first fiber bundle and the second fiber bundle intersect or crisscross.

* * * * *